(12) United States Patent
Bernhardt et al.

(10) Patent No.: US 6,581,695 B2
(45) Date of Patent: Jun. 24, 2003

(54) VEHICLE/IMPLEMENT COUPLING SYSTEM

(75) Inventors: Gerd Bernhardt, Hanichen (DE); Sergiy Fedotov, Dresden (DE); Ruslan Rudik, Dresden (DE); Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/058,937

(22) Filed: Jan. 29, 2002

(65) Prior Publication Data

US 2002/0125018 A1 Sep. 12, 2002

(30) Foreign Application Priority Data

Mar. 10, 2001 (DE) .......................................... 101 11 529

(51) Int. Cl.⁷ ............................................. A01B 59/043
(52) U.S. Cl. ...................... 172/439; 172/684.5; 701/50; 37/231; 37/234; 37/236
(58) Field of Search ................................ 701/50; 172/2, 172/439, 7, 684.5; 37/231, 234, 235, 236, 468, 414–417; 414/686, 723; 403/322.1, 321; 180/900; 280/186

(56) References Cited

U.S. PATENT DOCUMENTS

| | | | |
|---|---|---|---|
| 3,432,184 A | 3/1969 | Tweedy | 280/479 |
| 5,092,409 A | 3/1992 | Defrancq | 172/4.5 |
| 5,455,557 A | 10/1995 | Noll et al. | 340/431 |
| 6,076,847 A | 6/2000 | Thornton | 280/477 |
| 6,321,851 B1 | 11/2001 | Weiss et al. | 172/444 |

FOREIGN PATENT DOCUMENTS

| | | |
|---|---|---|
| DE | 42 13 355 A1 | 10/1993 |
| DE | 199 13 911 A1 | 10/1999 |
| DE | 199 50 808 A1 | 4/2001 |

*Primary Examiner*—Christopher J. Novosad

(57) ABSTRACT

A coupling system couples an implement to a utility vehicle, such as an agricultural or industrial vehicle, and includes a vehicle-mounted coupling frame and an implement-mounted coupling frame. The position of the vehicle-mounted coupling frame is adjustable by an adjustment mechanism. A position sensor senses the position of the implement-mounted coupling frame. An analysis unit determines the position of the implement-mounted coupling frame relative to the vehicle-mounted coupling frame. A control unit calculates a coupling motion path of the vehicle-mounted coupling frame. In response to a starting signal, the control unit causes the adjusting mechanism to move the vehicle-mounted coupling frame along the coupling motion path.

10 Claims, 5 Drawing Sheets

VEHICLE/IMPLEMENT COUPLING SYSTEM

FIELD OF THE INVENTION

The invention relates to a coupling system for coupling an implement to a utility vehicle.

BACKGROUND OF THE INVENTION

Various hitching interfaces, also called implement coupling devices, are known, with which, for instance, towed agricultural implements can be attached to an agricultural vehicle, such as a field tractor or a harvesting machine. Vehicle-mounted coupling frames are normally not rigidly connected to the vehicle, but can move relative to the vehicle, so that the hitched implement can also be moved relative to the vehicle. A number of possible coupling elements are known, such as hooks or coupling plates with surface-like coupling areas.

U.S. Pat. No. 3,432,184 describes a hitching device for a tractor with a triangular coupling plate that is connected to the tractor frame by way of several hydraulic and electrical actuators and which can be moved within a certain movement space translationally and rotationally relative to the tractor frame by operation of the actuators. The hitched implement likewise includes a triangular hitching plate, the upper edges of which are bent over in the manner of a flange so that they can receive the corresponding edges of the coupling plate. The known hitching device permits a simple and fast accommodation of mountable equipment from the vehicle cab, without the necessity of having a prior alignment of the tractor to the mountable equipment. To this end, the actuators can be controlled from an operating console in the vehicle cab. For hitching, the coupling plate is first lowered, then the vehicle is moved to bring the coupling plate into the vicinity of the hitching plate, and finally the actuators are moved with the vehicle remaining stationary in order to align the plates with one another, and if desired, to interlock them. Coupling is often difficult, however, since the operator has a poor view of the coupling point from the driver's cab, and has difficulty estimating the distances between the coupling plate and the hitching plate. A great deal of finesse is necessary to carry out the coupling process reliably. This requires patience and time.

For better viewing of the coupling process between vehicle and a towed vehicle coupling from the driver's seat, it was proposed by U.S. Pat. No. 6,076,847 to mount an obliquely positioned mirror above the towing coupling on the towed vehicle tongue, such that the operator can observe the towing coupling from above with the aid of the mirror. Even with this expedient, the maneuvering process is difficult.

SUMMARY OF THE INVENTION

An object of the invention is to provide a coupling device which overcomes the above-stated problems.

A further object of the invention is to provide a coupling device which simplifies and speeds up the coupling process, which saves time and fuel.

These and other objects are achieved by the present invention wherein a coupling system includes an implement interface having vehicle-mounted coupling frame and corresponding implement-mounted coupling frame. The spatial position of the vehicle-mounted coupling frame relative to the utility vehicle can be adjusted with adjusting means. The system includes a sensor device that recognizes or detects the position of the implement-mounted coupling frame. An analysis unit ascertains the position of the implement-mounted coupling frame relative to the vehicle-mounted coupling frame. A control unit calculates a movement path for the coupling process and, based on a start signal, drives the adjusting means such that the coupling process is performed completely automatically along the calculated motion path. Appropriate adjustment means are provided to adjust the spatial positions of the vehicle-mounted coupling frame relative to the vehicle.

To effect hitching of an implement, the utility machine is first driven into the vicinity of the implement. During the approach of the utility vehicle to the implement, the position of the implement-mounted coupling frame relative to a predetermined point on the utility vehicle, or to the position of the vehicle-mounted coupling frame, is detected continuously, or periodically at specifiable time intervals, by a sensor device and an analysis unit. In the process, the coordinates of the implement-mounted coupling frame are continuously calculated from the measured values obtained by the sensor device, and whether the implement-mounted coupling frame is within the range of motion (working area) of the vehicle-mounted coupling frame is continually checked. Since the vehicle-mounted coupling frame can be adjusted by the adjusting means within a relatively large range of motion, the driver has a large degree of freedom in aligning the utility vehicle relative to the mountable implement, and can rapidly approach the vehicle to the implement.

If the vehicle is driven into a position in which the implement-mounted coupling frame is in the working space, appropriate information, in the form, for instance, of an acoustic or optical signal, is delivered to the operator by the analysis unit. The operator then brings the utility vehicle to a stop and checks whether the coupling area is free of obstacles and danger-free hitching is possible. If this is the case, then the operator activates the automatic coupling process by, for instance, operating a pushbutton switch. Using the current relative position between the vehicle-mounted and implement-mounted coupling frame, the control unit calculates a movement path for the coupling process and drives the adjusting means to move the vehicle-mounted coupling frame automatically along the calculated movement path up to the implement-mounted coupling frame. In the calculation of the movement path, the position of the implement-mounted coupling points is used as the target position, which does not change for a stationary utility vehicle and implement. The actual momentary position of the vehicle-mounted coupling points is recognized or detected by a suitable sensor system interacting with the adjusting means.

The coupling system permits a largely automated coupling process between utility vehicle and mounted implement, placing no particular demands on the dexterity and experience of the operator. By this provision of an automatic coupling process, the operator is unburdened and can direct his attention completely to safety aspects, such as whether people are endangered by the coupling process or whether there are obstacles in the coupling area. The coupling process can be carried out quickly because it runs automatically and does not depend on the dexterity of the operator. This saves time and fuel.

The vehicle-mounted coupling elements are preferably arranged on a coupling frame that is connected to the vehicle by variable-length adjusting means. Hydraulic cylinders acting on one or both sides, for instance, can be considered as adjusting means. Other hydraulic or electromechanical adjusting elements can also be employed. The coupling frame can be constructed in a variety of ways. It may, for instance, be an essentially triangular plate, constructed as a single-phase coupler and at the vertices of which the adjusting means act, as is seen from U.S. Pat. No. 3,432,184. The coupling frame may also have the form of an isosceles or equilateral triangular frame, on the vertices of which the adjusting means act via articulations and, on the other side of which are fastened coupling elements in the form of hooks and the like, as is evident in subsequently published DE patent 199 51 840. The coupling frame may also be a portal frame with a horizontal upper beam and two vertical side beams as described in U.S. Pat. No. 5,092,409.

Preferably, the coupling device includes at least six adjustable-length adjusting means, the first end of each of which is articulated to the vehicle and the respective second end of which is articulated to a coupling frame on which the coupling elements are arranged. The adjusting means are arranged in closed kinematic chains and permit movement of the coupling frame with six degrees of freedom. Such an arrangement of adjusting means is shown in published DE 199 51 840, which is incorporated by reference herein. With this arrangement, the coupling elements or coupling points can be moved arbitrarily with six degrees of freedom within wide limits of a large working space. This permits an automatic coupling to be performed even with a rough positioning of the utility vehicle.

The adjusting means are preferably arranged in the manner of a hexapod, as described in DE 199 51 840. The adjusting means are equipped with position sensors, from the measured values of which the actual momentary spatial position of the coupling frame, and thus the actual positions of the coupling elements or coupling points, can be determined. In this regard, it is possible to employ conventional calculation methods as described in "The design of the Hexaglide kinematics—methodology for the design of parallel kinematics machine tools", VDI-Berichte No. 1427, 1988.

Preferably, sensors are provided for measuring the length of the adjustable-length adjusting means. The coordinates of the hexapod hitch can be calculated from the measured values of the sensors. The sensors can be integrated into, for instance, the hydraulic cylinders of a hexapod arrangement. A number of conventional methods, previously used for other applications, can be considered as the sensor device for recognition of the spatial position of the implement-mounted coupling points.

One suitable method for position recognition makes use of image processing, by means of which the signals of one or more cameras are analyzed. For example, two cameras could be mounted side-by-side at the corner points of the driver cab roof and pointed towards the implement-mounted coupling structure. The cameras record the coupling structure from a fixed geometric arrangement and distinguish characteristic features of the coupling structure to be measured. They transfer the digital images to a control apparatus in which the images are processed with the appropriate software to determine the coordinates of the implement-mounted coupling elements or coupling points.

Image-processing methods of the type employed for position recognition of a workpiece in industrial manufacturing automation technology are used in the analysis. According to one known method, characteristic, optically prominent areas of a workpiece, such as corners or holes, are first detected and are then associated with the corresponding areas of a known prototype using relaxation. By virtue of this association, the position of the entire workpiece can then be ascertained.

Preferably, parts of the adjusting means, particularly the hexapod, are also recorded by the two cameras, so that the coordinates of the implement-mounted coupling points relative to the hexapod extension are ascertained in the processing of the images. This permits correction of errors caused by mounting tolerances of the two cameras or by slight displacements of the cameras as a result of vehicle operation.

Depending on the image-processing software employed, black-and-white or color cameras are employed. The image-processing method has the advantage that, even if a characteristic feature is completely or partially absent in the measurement (for instance, when this feature is covered by components), the position of the coupling points can still be unambiguously determined. A corresponding software for robotic use is offered by the firm ISRA Vision Systems AG, Darmstadt, Del.

In another sensor device for recognizing the spatial orientation and position of the implement-mounted coupling points, so-called "3D magnetic sensors" are utilized. Here a low-frequency field, measured by a receiver on the utility machine, is generated by means of a transmitter mounted on the implement. The position and orientation of the coupling points on the implement can then be determined algorithmically and relayed to the control unit.

Ultrasound sensors can be used as an alternative to magnetic sensors. Ultrasound sensors consist of three components: a transmitter, a receiver and an electronics unit. The transmitter consists of three ultrasound generators positioned in a triangular configuration on the implement. Corresponding to these, a small triangle of ultrasound microphones is placed on the utility machine. The data from the microphones is converted in the control apparatus into coordinates of the coupling points and passed on to the hexapod controller. Since sound waves are involved here, this system is susceptible to extraneous sound sources. The problem of the direct connection between transmitter and receiver can be solved by multiplexing several transmitters, to the detriment of the update rate. Ultrasound solutions represent cheap and sufficiently good alternatives to magnetic sensors.

Another sensor device for recognizing the spatial position of the device-mounted coupling points makes use of laser sensors of the type used, for instance, to recognize the crop edge in the automatic steering of combines, as described in "The eyes of the combine," Profi 12, 1999, pp. 48–49. Such a sensor device consists, for instance, of two laser sensors, each having a transmitter and a receiver, that are installed in the cab roof area of the utility vehicle and can be pivoted back and forth within a fixed angular range of several degrees. The region being sensed results from the pivot angle and the distance from the implement. The sensor emits infrared laser beams at a pulse frequency of, for instance, 60 MHz. The receiver detects the beams reflected from characteristic regions, such as frame parts and the like. A processor calculates the position of the characteristic region from the reflection data, and derives the position of the coupling points from it.

The scanning process must be carried out spatially to ascertain the position of the implement coupling frame. That means that the transmitter and the receiver of the laser sensor will be moved, not in just one plane, but in two mutually orthogonal ones. It is also possible for several laser sensors, each consisting of a transmitter and a receiver, to be employed. The transmitters and receivers of each laser sensor are each moved in their own assigned horizontal plane. The horizontal planes of all the laser sensors are offset from one another vertically by predetermined values. Thus a three-dimensional image of the scanned space is created from the data of all the laser sensors. The sensors should be placed on the utility machine such that the implement interface, particularly the hexapod, does not lie in the scanning area, so that the measured values are not at all influenced or only slightly influenced by its movements. To achieve this, it is possible for laser sensors to be integrated into the hexapod by, for instance, installing them in the vicinity of the coupling frame or on it.

The position of the implement-mounted coupling elements or coupling points and their relative coordination with the vehicle-mounted coupling elements or coupling points can also be determined using GPS (global positioning system) technology by installing appropriate GPS receivers on the utility vehicle and the implement to be coupled and analyzing the GPS signals appropriately. To determine the spatial orientation of the coupling elements, it is possible, for instance, for the utility vehicle and the implement each to have three GPS systems installed on it.

Other measuring systems for determining the relative spatial position of the vehicle-mounted and the implement-mounted coupling frame can also be used. For example, radar transmitters that receive and analyze the reflection signals from reflectors installed on the implement to be coupled can be used.

Preferably, the system also includes a user-actuated control element for activating the automatic coupling process. Before initiating the automatic coupling process, the operator checks whether the coupling area is free of obstacles. Preferably, the user can also employ the control element to interrupt the coupling process at any time.

Often, coupling is not accomplished by a straight-line approach of the vehicle-mounted coupling points to the implement-mounted coupling points. If, for instance, coupling hooks are used, then a hook-up must take place in the final section of the approach, which may, for instance, require a vertical course for the motion path. This final section, however, cannot easily be calculated by the control unit on the basis of the measured positions of the coupling frame. Preferably, at least one section of the motion path is preprogrammed in the control unit. Parameters for the motion path are to be specified by the controller. These parameters are derived from the coupling process and the geometry data of the respective coupling system.

If obstacles are recognized by the sensor and analysis unit during the automatic coupling process, the coupling process is automatically interrupted. It can be resumed by a start signal initiated by the operator.

DESCRIPTION OF THE PREFERRED EMBODIMENT

Figure 1:
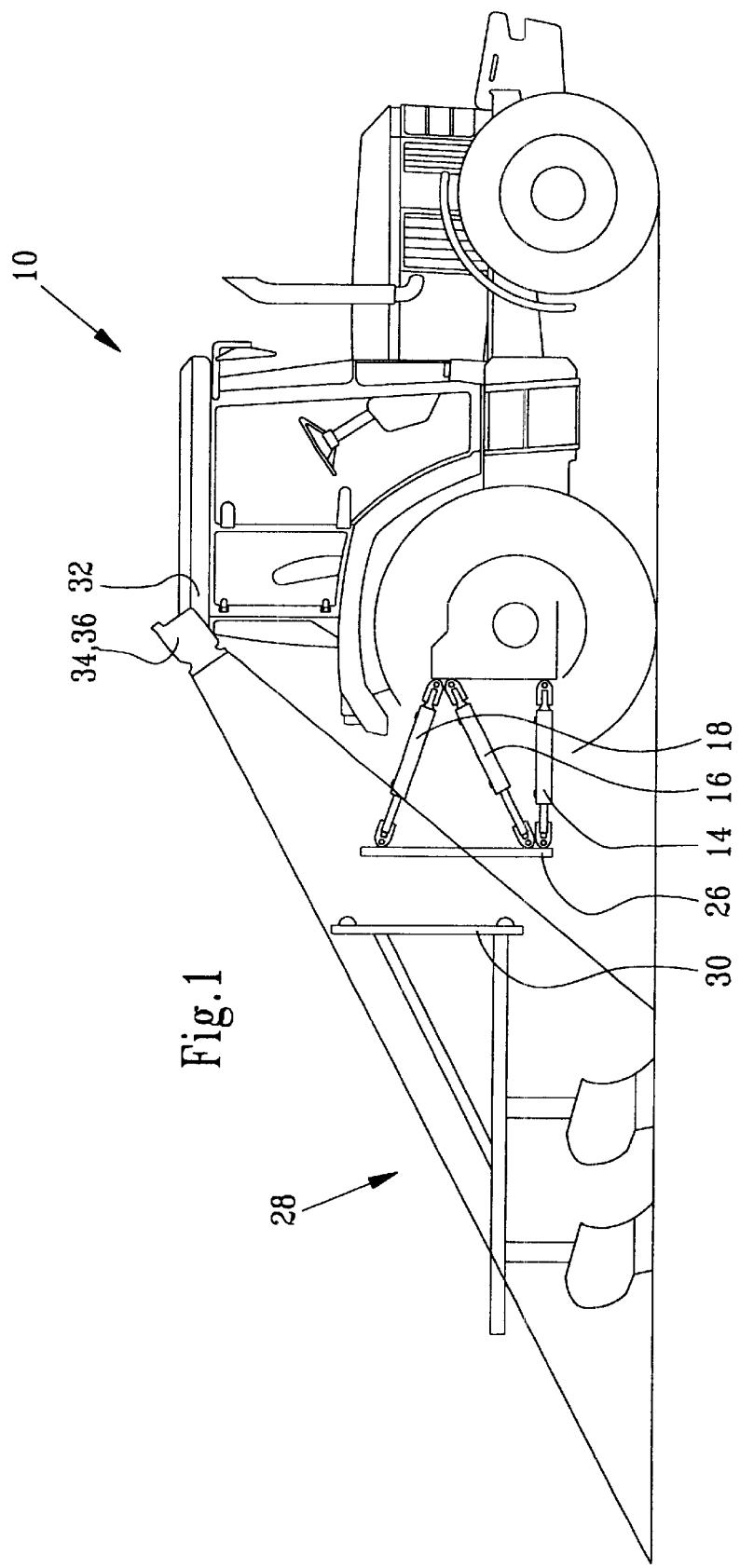
FIG. 1 is a side view of a plow and a tractor with a hitching interface and an optical sensor device.
Figure 2:
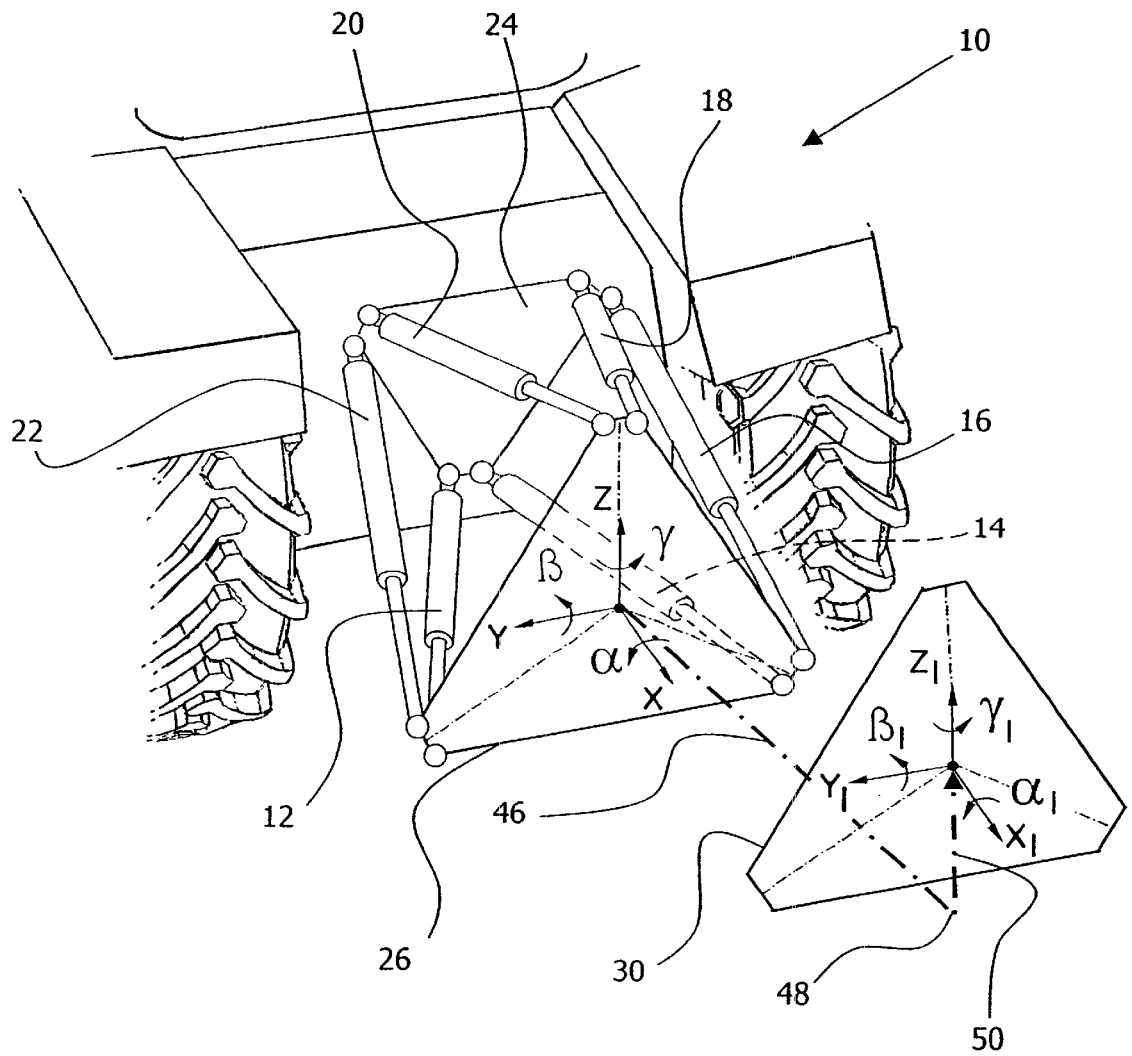
FIG. 2 is an oblique schematic sketch of the hitching interface of FIG. 1, in the direction of the vehicle rear end.

FIGS. 1 and 2 show a tractor 10 with a hitching interface 11 which includes six hydraulic cylinders 12, 14, 16, 18, 20, 22 arranged a hexapod manner. One end of each cylinder is pivotally coupled to the rear end of a utility vehicle 10. The other end of each cylinder is pivotally coupled to coupling triangle 26. Details of such a hitching interface are described in greater detail in U.S. Pat. No. 6,321,851, issued Nov. 27, 2001. An implement, such as a plow 28 is located behind tractor 10 and an implement coupling triangle 30 is mounted thereon. Coupling triangle 30 can be coupled in the usual manner to vehicle coupling triangle 26, in the manner, for example, of a Weiste triangle. For coupling, it is also possible to use rearward-projecting, open-upwards coupling hooks (not shown) at the vertices of vehicle-mounted coupling triangle 26, which engage in corresponding receptacles placed on implement-mounted coupling triangle 30. The coupling hooks and receptacles are the aforementioned coupling elements or coupling points.

At the lateral corner points of vehicle cab roof 32, two cameras 34, 36 are mounted, only one of which is visible in FIG. 1. The cameras 34, 36 are pointed at coupling triangle 30 and monitor the coupling area.

Figure 3:
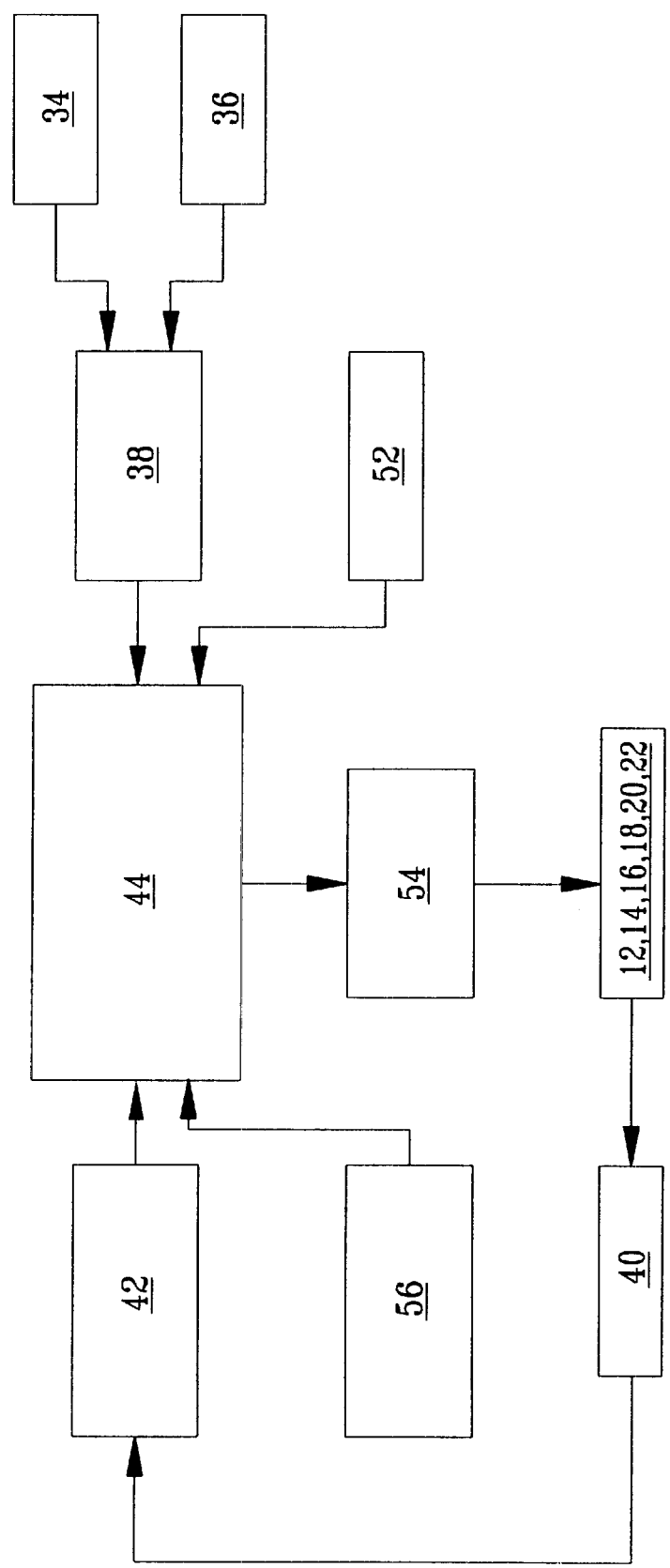
FIG. 3 is a schematic block diagram of a control unit for controlling the implement interface.

Referring now to FIG. 3, an electronic control system 33 includes an electronic image-processing unit 38 which receives and analyzes the signals from two cameras 34, 36. Image-processing unit 38 analyzes the images of the two cameras 34, 36 with respect to characteristic image elements and, using conventional image-processing methods, determines the X Y Z spatial coordinates of implement-mounted coupling triangle 30 in relation to the position of the vehicle's chassis. Cylinder position sensors 40 generate and transmit to electronic hexapod computing unit 42 output signals which correspond to the respective excursion of hydraulic cylinders 12, 14, 16, 18, 20, 22. Although not shown in FIGS. 1 and 2, the position sensors 40 are preferably integrated into each of the hydraulic cylinders 12, 14, 16, 18, 20, 22. From the position sensor signals, the computing unit 42 calculates the three dimensional spatial coordinates of coupling triangle 26 in relation to the position of the vehicle 10.

The coordinates calculated by image-processing unit 38 and hexapod computing unit 42 are communicated to a control unit 44, which calculates the first portion 46 of a motion path. The first portion 46 of the motion path involves a straight line that connects the initial X Y Z coordinates of the coupling frame 26 to the coordinates of a target point 48, which is in a fixed spatial relationship to implement-mounted coupling frame 30. It is possible to superimpose coordinate rotations onto the straight-line motion path. A second motion path 50, which has been determined by a learning mode and depends on the nature of the actual coupling mechanism, is stored in control unit 44.

Control unit 44 is connected to an operator controlled activation switch 52. If an activation signal is emitted by activation switch 52, then control unit 44 calculates, from first and second motion paths 46, 50, control signals for proportional valves 54, which supply appropriate amounts of oil to the respective hydraulic cylinders 12, 14, 16, 18, 20, 22 so that the latter are extended and/or retracted in order to move vehicle-mounted coupling frame 26 along motion paths 46, 50 and automatically approach it to implement-mounted coupling frame 30 and carry out the coupling process. An operator controlled control unit 56, such as a joystick, is connected to control unit 44 and can be used to manually control coupling operations.

Figure 4:
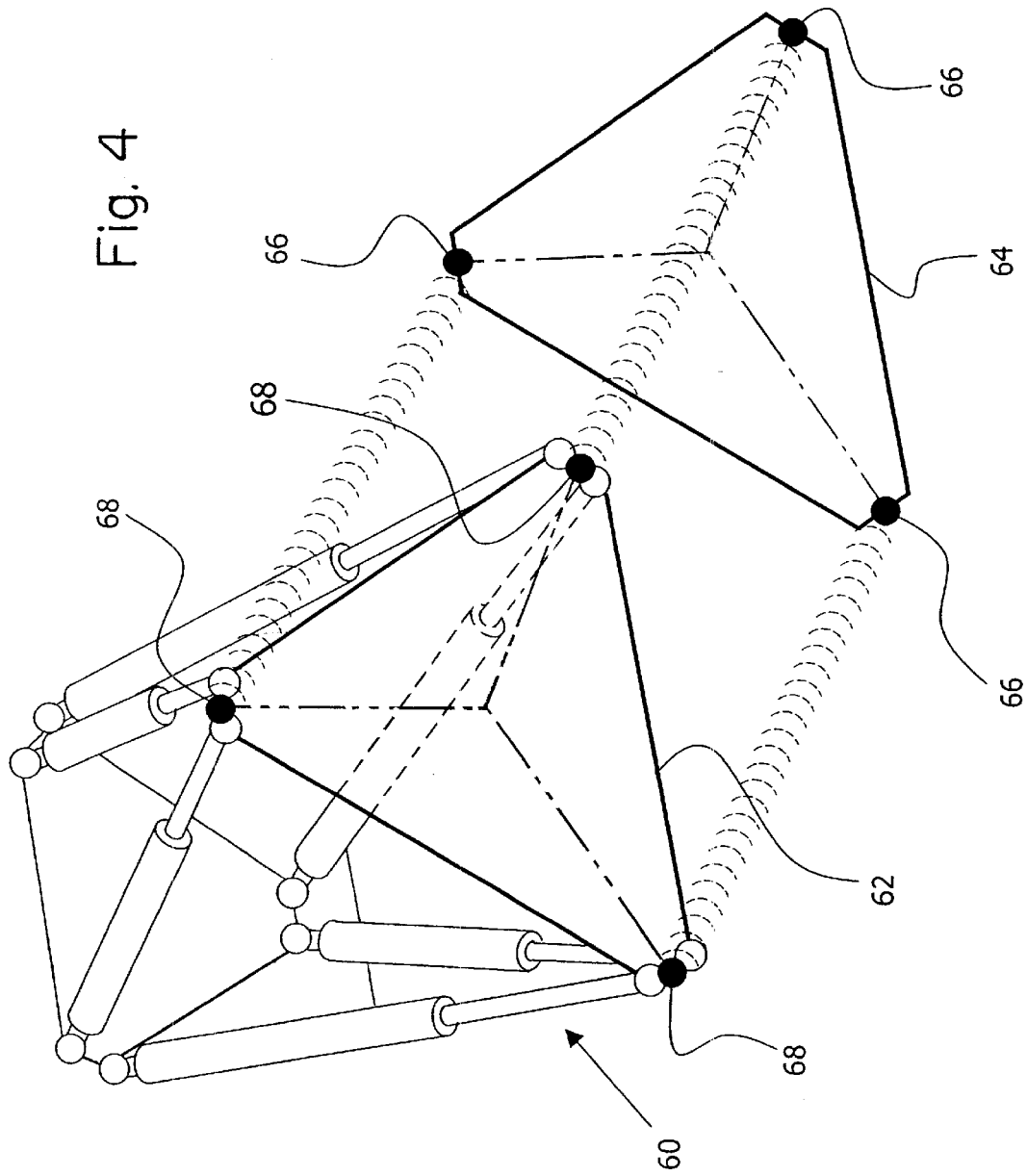
FIG. 4 is a simplified view of a hexapod hitch with magnetic or acoustic sensor devices.

In place of the cameras and image processing, other sensor devices can be used to determine the spatial position of the implement-mounted coupling points, such as magnetic transmitters and sensors made by Ascension Technology Corporation. Referring now to FIG. 4, a vehicle-mounted hexapod arrangement 60 supports a vehicle triangular coupling frame 62 near to an implement-mounted triangular coupling frame 64. Magnetic transmitters 66 are mounted at each of the vertices of frame 64 and generate magnetic fields which are received by magnetic receivers 68 mounted on frame 62. The relative position of the implement-mounted coupling frame 64 can be unambiguously determined from the received signals, so that a motion path for coupling can be calculated. Alternatively, ultrasound transmitters and receivers (not shown) could be used in place of the magnetic transmitters and receivers.

Figure 5:
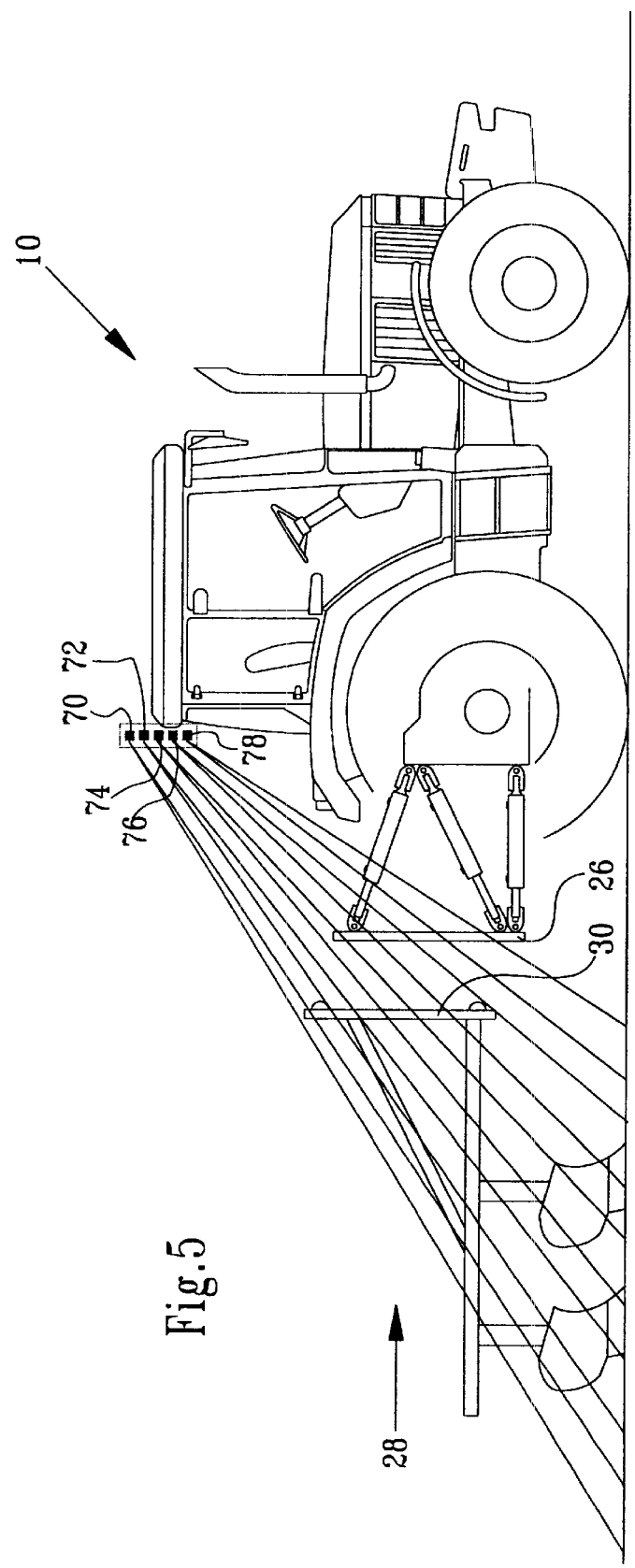
FIG. 5 is a simplified side view of a hitch interface with laser sensors.

Referring now to FIG. 5, instead of the optical cameras shown of FIG. 1, the system could include a plurality, such as five, laser sensors 70, 72, 74, 76, 78, each consisting of a transmitter and a receiver. The laser sensors are preferably pivotal laterally, and arranged so that each laser sensor projects a beam which is separated from the beams of the other laser sensors. Each beam is directed at or scans a different corresponding portion of the coupling frames 28 and 30. A three-dimensional image of the hitching space can be derived from data generated by the laser sensors 70–78. Prominent elements of coupling frames 28 and/or 30 are recognized by the analysis unit, so that implement-related coordinates can be calculated from them. Analysis of the data and control of the hexapod can be accomplished in a manner similar to that described for optical image-processing.

For reasons of safety, the coupling process should be performed only with a stationary utility vehicle and a stationary implement. Therefore, the control unit 44 preferably includes a shutoff function that perceives relative motions between the utility vehicle 10 and the implement 28 and interrupts the automatic coupling process when a certain rate of relative motion is exceeded. For instance, the actual position of the implement-mounted coupling points is periodically measured at specifiable time intervals during an automatic coupling process, i.e., during the automatic approach. These values are compared to the calculated desired position for the motion path. If the deviation between actual position and desired position exceeds a specifiable value, then this is an indication that the position of the implement 28 relative to the utility vehicle 10 has changed, which may mean that the utility vehicle 10 and/or the implement 28 is moving relative to the ground. The automatic coupling process is then interrupted and can be restarted by an activation command initiated by the operator, wherein the position of the implement-mounted coupling points is again transferred to the control unit 44, which calculates a new motion path. In case of small deviations between actual position and desired position, the coupling process is not interrupted.

Preferably, the control unit 44 also includes a learning mode for learning the course of this motion path. To carry out the learning mode, the operator first controls the vehicle-mounted coupling frame 26 by actuating the appropriate control elements such that the vehicle-mounted coupling frame 26 occupies a starting position in the vicinity of the implement-mounted coupling frame 28. The operator then activates a learning mode, resumes the coupling process manually, terminates it, and finally generates a termination signal to indicate the end of the learning mode to the control unit 44. While in learning mode, the control unit 44 records the motion parameters of the vehicle-mounted coupling frame 26. When the automatic coupling process is subsequently performed, the motion learned in learning mode is imitated by the control unit 44.

The preprogrammed portions of the motion path depends on the nature of the coupling mechanism. For coupling various different towed implements, several motion path sections matched to the cultivation implement in question can be preprogrammed and then selected by the operator with a suitable input device. If, for instance, a coupling according to the so-called Weiste triangle method (as described in DE-AS 1 215 419) is to be made, the vehicle-mounted Weiste triangle is first moved into the vicinity of the implement-mounted receiving triangle and oriented parallel to it. Upon reaching a defined relative position, a control maneuver based on the preprogrammed motion path occurs. The Weiste triangle is guided parallel to the receiving triangle until it is underneath it and ready for coupling. In a final preprogrammed motion section, the Weiste triangle is pushed upwards into the receiving triangle, whereby the two triangles become engaged with one another. The individual sections of the motion path can be straight lines. If necessary, however, obstacles must be taken into consideration.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. An agricultural vehicle/implement mechanical coupling system having a movable coupling frame mounted on an agricultural vehicle, a stationary coupling frame mounted on an agricultural implement, and an adjusting mechanism for adjusting a position of the movable coupling frame, the coupling system comprising:

a position sensor generating position signals representing the position of the stationary coupling frame, the position sensor having all its components mounted on the agricultural vehicle and;

an analysis unit which determines the position of the stationary coupling frame relative to the movable coupling frame; and a control unit which determines a coupling motion path for a coupling process and, in response to a start signal, causes the adjusting mechanism to automatically move the movable coupling frame along the path and mechanically couple the movable coupling frame to the stationary coupling frame during a coupling process.

2. The coupling system of claim 1 wherein:

a plurality of coupling elements are arranged on the movable coupling frame, and the adjusting mechanism comprises variable-length members.

3. The coupling system of claim 2, wherein:

the adjusting mechanism comprises at least six variable-length members, each member having a first end pivotally coupled to the vehicle and a second end pivotally coupled to the movable coupling frame, and the members form closed kinematic chains and permit the movement of the movable coupling frame with six degrees of freedom.

4. The coupling system of claim 3, wherein:

the members are arranged in the manner of a hexapod.

5. The coupling system of claim 3, further comprising:

length sensors generating length signals representing a length of the variable-length members, the control unit determining coordinates of the movable coupling frame from the length signals.

6. The coupling system of claim 1, wherein:

the position sensor comprises a camera mounted on the vehicle and aimed at the stationary coupling frame, and the control unit includes an image-processing unit which processes image signals generated by the cameras.

7. The coupling system of claim 1, further comprising:

an operator controlled control device, the control unit activating the coupling process in response to operator manipulation of the control device.

8. The coupling system of claim 1, wherein:

the control unit interrupts the coupling process in response to detection of relative motion between the vehicle and the implement.

9. The coupling system of claim 1, wherein:

the control unit moves the movable coupling frame through a motion path which is stored in the control unit.

10. The coupling system of claim 1, wherein:

the control unit includes a learning mode operable to store a motion path of movable coupling frame therein.

* * * * *